United States Patent [19]

Ikebe et al.

[11] Patent Number: 4,979,065
[45] Date of Patent: Dec. 18, 1990

[54] DISC CARTRIDGE HAVING A LINER AND AN ELASTIC MEMBER FOR MAINTAINING THE LINER IN CONTACT WITH A DISC

[75] Inventors: Masaru Ikebe; Haruo Shiba; Kimio Tanaka; Kenkichi Akaoka, all of Nagano, Japan

[73] Assignee: TDK Corporation, Japan

[21] Appl. No.: 274,761

[22] Filed: Nov. 22, 1988

[30] Foreign Application Priority Data

Nov. 26, 1987 [JP] Japan ............................ 62-178823[U]

[51] Int. Cl.$^5$ ............................................. G11B 23/03
[52] U.S. Cl. ................................................... 360/133
[58] Field of Search ........................................ 360/133

[56] References Cited

U.S. PATENT DOCUMENTS 4,620,247 10/1986 Papciak et al. ..................... 360/133
4,677,516 6/1987 Iizuka et al. ........................ 360/133
4,739,433 4/1988 Oishi .................................... 360/133

Primary Examiner—Robert S. Tupper
Attorney, Agent, or Firm—Steinberg & Raskin

[57] ABSTRACT

A disc cartridge capable of ensuring its stable and positive operation without damaging a disc while satisfactorily producing a cleaning effect and maintaining adequate contact between the head of a cartridge operating unit and the disc. Each of a pair elastic members respectively mounted on the upper and lower inner surfaces of a casing forcibly presses a sheet-like liner situated between the elastic member and a disc against the disc through a projection portion having a predetermined length formed as part of the elastic member, resulting in the liner contacting the disc with a force at substantially a constant level for a long period of time.

9 Claims, 3 Drawing Sheets

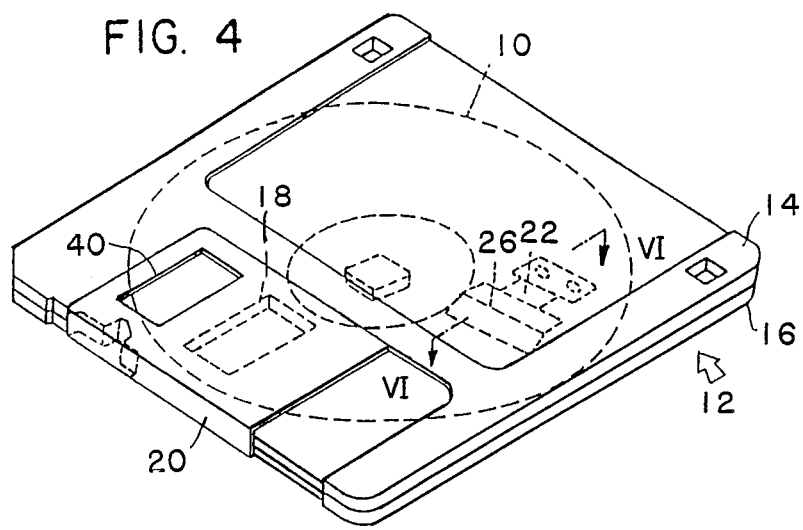
FIG. 4
FIG. 6
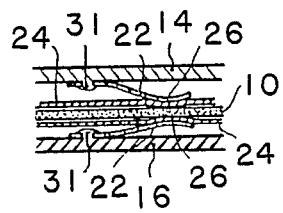
FIG. 7
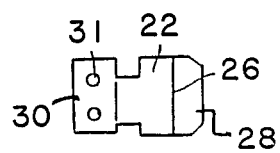
FIG. 8
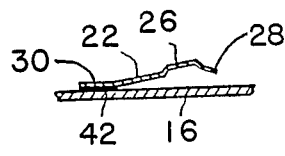
FIG. 9
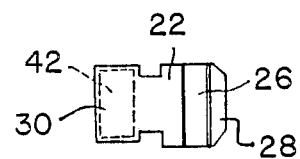

DISC CARTRIDGE HAVING A LINER AND AN ELASTIC MEMBER FOR MAINTAINING THE LINER IN CONTACT WITH A DISC

BACKGROUND OF THE INVENTION

1. Field of the Invention

This invention relates to a disc cartridge, and more particularly to a disc cartridge which is adapted to rotatably receive a disc medium such as a magnetic disc, a floppy disc, a hard disc, a cleaning disc, an optical disc, a photo-magnetic disc or the like therein.

2. Description of the Prior Art

In general, in a conventional disc cartridge, a floppy disc, a compact disc, a video disc or the like used for a digital-data storing unit, a video unit or the like is rotatably received in a casing for protection against damage and dust to assure its safety. Also, in the conventional disc cartridge, an elastic member is provided on an inner surface of the casing to impel a sheet-like liner in one direction, so that the liner can contact a surface of the disc to clean the surface of the disc and ensure satisfactory contact between the disc and a recording and-/or reproducing head (hereinafter referred to as "head") of a disc cartridge operating unit (hereinafter referred to as "cartridge operating unit").

This prior art construction of a disc cartridge will be described with reference to FIGS. 1 to 3.

In the conventional disc cartridge, as shown in FIG. 1, elastic members 100 are mounted at one end thereof on upper and lower inner surfaces of a casing 102 to forcibly contact sheet-like liners 104 arranged in the casing with both upper and lower surfaces of a disc 106 in such a manner as to interpose the disc 106 therebetween.

Alternatively, the conventional disc cartridge may be constructed in such a manner is shown in FIGS. 2 and 3. More particularly, an elastic member 100 is provided on one of the respective upper and lower inner surfaces of a casing 102 and a projecting receiver 108 is provided opposite to the elastic member 100 in a manner to interpose liners 104 and a disc 106 therebetween.

In the prior art disc cartridges constructed as hereinbefore described, the elastic member 100 is made of a sheet composed of material such as metal or polyethylene terephthalate (hereinafter referred to as "PET") and the sheet is bent at a portion thereof mounted on the casing. However, use of a PET sheet for the elastic member causes the bent portion of the elastic member to produce incremental creep deformation with the passage of thus time, resulting in a portion of the elastic member which contacts the disc being gradually positionally lowered. This leads to a decrease the in pressing force with which the elastic member forces the liner against the disc and thus changes the angle $\theta$ between the elastic member and the disc. Thus, in the conventional disc cartridge, the elastic member fails to effectively maintain the pressing force of the liner against the disc at a constant level for a long period of time, resulting in the liner failing to satisfactory cleaning effect of clean the surface of the disc and satisfactory contact between the disc and a head of a cartridge operating unit consequently cannot be maintained.

In use of a metal sheet for the elastic member, even a slight burr on an edge of the elastic member causes damage to the disc and thus reduces the usable lifetime and the reliability of the disc cartridge.

Accordingly, it would be highly desirable to develop a disc cartridge which is capable of applying a pressing force at a constant level to a cleaning liner for a long period of time and prevent damage of a disc to ensure a long lifetime endurance and high reliability of for the disc cartridge.

SUMMARY OF THE INVENTION

In, accordance with the present invention, preferred embodiment a disc cartridge are hereinafter described. The disc cartridge generally includes a casing having a space defined therein and a recording and/or reproducing disc receivable in the space of the casing. In the casing are arranged at least one sheet-like liner the sheet liner being arranged in a manner to be contactable with a surface of the disc and at least one elastic member for forcibly contacting the liner with the disc. The elastic member is formed so as to have one end affixed to an inner surface of the casing and the other end freely movable acting as a free end. Also, the elastic member is provided with a projection portion through which the elastic member forces the liner into contact with the disc.

In a preferred embodiment of the present invention, the elastic member is composed of metal and has a somewhat accurate. Alternatively, in another preferred embodiment the elastic member is composed of a synthetic resin material and has a a substantially somewhat arcuate shape.

In a preferred embodiment of the present invention, the elastic member is shaped such that a distance between the free end of the elastic member and the inner surface of the casing is substantially equal to or smaller than that between a top of the projection portion and the inner surface of the casing.

In a preferred embodiment of the present invention, the elastic member is so arranged that the projection portion thereof extends in the radial direction of the disc, and the projection has a length larger than a distance between an innermost periphery of the recording section of the disc and its outermost periphery. Also, the projection can formed so as to have either a pointed surface top or a planar top surface.

The sheet-like liner may be arranged on each of both sides of the disc and the elastic member may be mounted on each of the upper and lower inner surfaces of the casing with each of the liners being interposed between the disc and the elastic member.

Accordingly, it is an object of the present invention to provide a disc cartridge which is capable of ensuring its stable and positive operation for a long period of time.

It is another object of the present invention to provide a disc cartridge which is capable of not only greatly increasing its useable lifetime but its reliability in operation.

It is a further object of the present invention to provide a disc cartridge which is capable of producing a satisfactory disc cleaning effect and keeping satisfactory contact between the head of a cartridge operating unit and a disc for a long period of time.

It is still another object of the present invention to provide a disc cartridge which is capable of effectively preventing damage to a disc therein irrespective of the location of its elastic member.

It is still a further object of the present invention to provide a disc cartridge which is capable of accomplishing the above-described objects with a simple structure and at a low cost.

Still other objects and advantages of the invention will be disclosed herein after.

BRIEF DESCRIPTION OF THE DRAWINGS

For a fuller understanding of the invention, reference is made to the following description taken in connection with the accompanying drawings; wherein:

FIG. 4 is a perspective view showing an embodiment of a disc cartridge according to the present invention;

FIG. 6 is a fragmentary sectional view taken along line VI—VI of FIG. 4;

FIG. 7 is a plan view showing an elastic member;

FIG. 8 is a vertical sectional view showing a modification of an elastic member; and FIG. 9 is a plan view of the elastic member shown in FIG. 8.

DETAILED DESCRIPTION OF THE PREFERRED EMBODIMENTS

Figure 1:
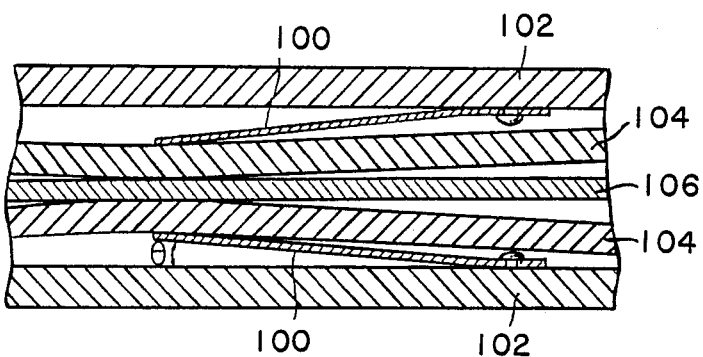
FIG. 1 is a fragmentary enlarged vertical sectional view showing a manner of arrangement of an elastic member employed in a prior art cartridge.
Figure 2:
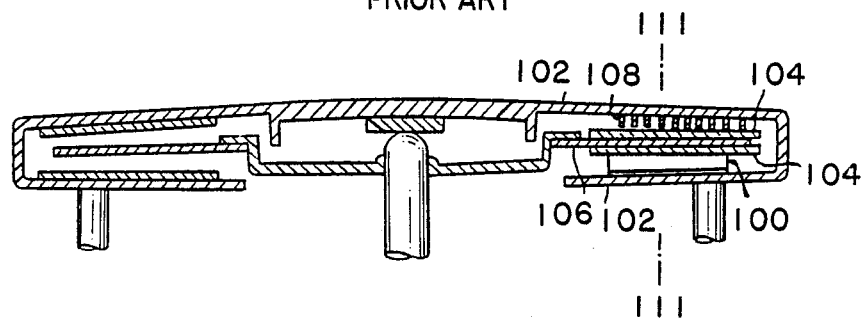
FIG. 2 is a fragmentary vertical sectional view showing another manner of arrangement of an elastic member employed in a prior art cartridge.
Figure 3:
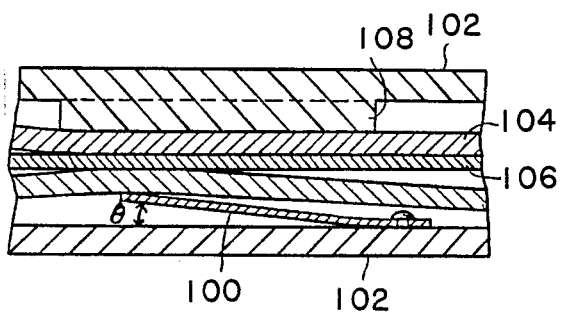
FIG. 3 is a sectional view taken along line III—III of FIG. 2.

A disc cartridge according to the present invention will be described hereinafter with reference to FIGS. 4 to 9, wherein like reference numerals designate like or corresponding parts throughout.

The following description will be made in connection with a floppy disc cartridge, however, as hereinbefore stated it is intended that the present invention is not limited to a disc cartridge for floppy disc.

FIGS. 4 to 9 illustrate a floppy disc cartridge which is an embodiment of a disc cartridge according to the present invention.

A floppy disc cartridge of the illustrated embodiment generally includes a floppy disc 10 serving as a recording and/or reproducing disc medium and a casing 12 for rotatably receiving the floppy disc 10 therein. The casing 12 comprises an upper casing member 14 and a lower casing member 16, which are joined together to form the casing 12 and define a disc receiving space in the casing. The casing 12 is formed with at least one head inserting hole or window 18 for inserting a head of a cartridge operating unit therethrough into the casing 12. The disc cartridge also includes a shutter 20 for opening and closing the head inserting window 18. For this purpose, the shutter 20 is formed into a shape so as to be interposable between the upper and lower casing members 14 and 16 of the casing 12 and slidably into and out of the casing 12.

Figure 5:
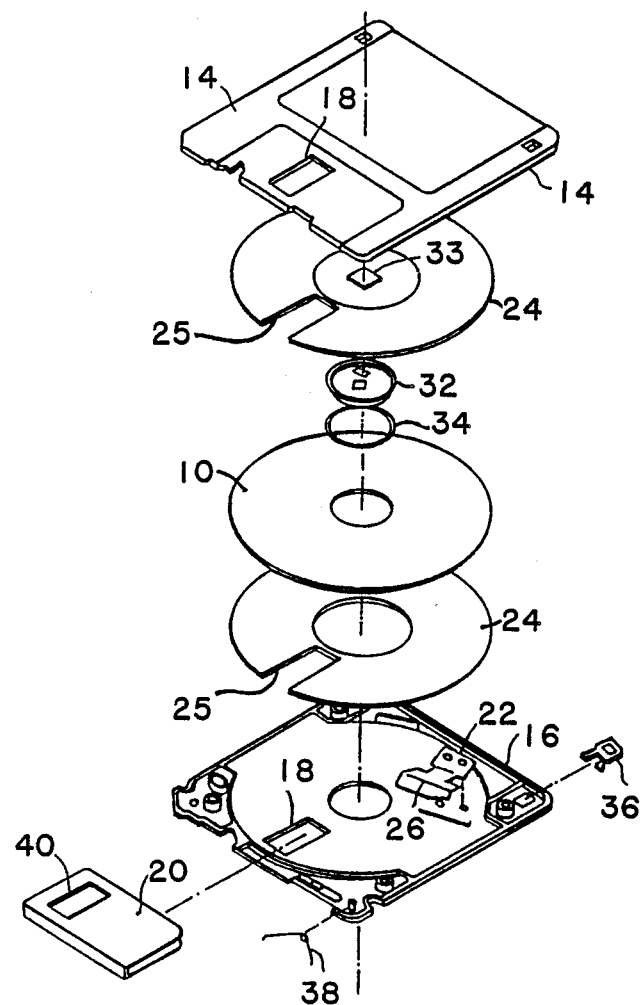
FIG. 5 is an exploded perspective view of the disc cartridge shown in FIG. 4.

The disc cartridge of the illustrated embodiment also includes at least one elastic member 22 mounted on an inner surface of the casing 12 and at least one sheet-like liner 24 situated in the casing so as to be interposed between the disc 10 and the elastic member 22 and contactable with a surface of the disc 10. The liner 24, as shown in FIG. 5, is formed into a circular shape corresponding to the disc 10 except that it is formed with a cutout 25 in a manner to positionally correspond to the head inserting hole 18 of the casing 12. The elastic member 22 is adapted to force the sheet-like liner 24 in a direction so as to forcibly contact the liner with the surface of the disc 10. For this purpose, the elastic member 22 is formed so as to have a pressing projecting 26 which is pressedly abutted against an outer surface of the liner 24 to force it toward the liner 24, resulting in the liner contacting with the disc. The projecting 26 is preferably formed so as to extend a predetermined distance in the width direction of the elastic member 22. In the illustrated embodiment, the projecting 26 is formed so as to have a substantially straight ridge-like shape.

In the illustrated embodiment, the elastic member 22 is arranged on an inner surface of each of the upper and lower casing members 14 and 16 of the casing 12 and the sheet-like liner 24 is arranged on each of both sides of the disc 10.

The elastic members 22 each may be formed of a metal material or a plastic or synthetic resin material such as PET into somewhat arcuate shape as shown in FIGS. 6 and 7. More particularly, it may be formed so as to have one end or a distal end 28 serving as a free end and the other end proximal end 30 affixed to the inner surface of the casing 102. The affixing may be carried out by fusion bonding between raised joining portions 31 of the proximal end 30 and the inner surface of the casing 12. Alternatively, the affixing may be accomplished using any suitable adhesive means such as an adhesive tape. Also, in this preffered embodiment, the pressing projection 26 is formed at a portion of the elastic member 22 adjacent to the distal end 28.

In addition, the elastic member 22 is preferably constructed so that the free end or distal end 28 is spaced from the inner surface of the casing 12 by a distance smaller than a distance between the top of the projection 26 and the inner surface of the casing 12. Such construction of the elastic member 22 causes it to properly force the liner 24 against the disc 10 without contacting the distal end 28 with the liner 24 and disc 10.

Also, it is preferable that the projecting 26 has a length larger than the distance between an innermost periphery of a recording section of the disc 10 and its outermost periphery and the elastic member 22 is so situated that the projection 26 extends in a radial direction of the disc 10. The projecting 26 of such construction may be formed by bending or drawing or as the bent or drawn portion when a sheet material is subjected to bending or drawing for formation of the elastic member Also, the disc cartridge may include a central plate 33. Moreover, the disc cartridge includes a central core 32, an adhesive tape 34, an erasure preventing plug 36 and a shutter spring 38 as in the conventional floppy disc cartridge described hereinbefore. Reference numeral 40 designates a window formed at each of both surfaces of the shutter 20 in a manner to positionally correspond to the head inserting hole 18 of the casing 12.

The disc cartridge of the illustrated embodiment, as described hereinbefore, is constructed in such a manner that the disc-like medium 10 is interposed between a pair of the sheet-like liners 24 and the elastic members 22 each are situated so as to contact and thereby force the sheet-like liner 24 through the projection 26 against the disc 10, so that each of the liners 24 may be kept in contact with the surface of the disc 10 with a substantially constant pressing force for a long period of time. Also, such construction of the illustrated embodiment effectively prevents damage of the disc. Furthermore, it allows the disc to have a relatively large recording and/or reproducing area including its outermost periphery, so that the disc cartridge may exhibit high reliability and accuracy.

FIGS. 8 and 9 show another preferred embodiment having a modification of the elastic member 22. In the elastic member shows in FIGS. 8 and 9, the projection portion 26 has a planar top. The remaining part of the elastic member 22 may be constructed in substantially the same manner as that in the embodiment described hereinbefore. The above-described shape of the projection portion 26 effectively prevents creep deformation of the projection portion 26, so that the elastic member 22 may more satisfactorily produce pressing force at substantially a constant level over a long period of time. Also, the elastic member 22 likewise prevents damage to the disc because it prevents its distal end from contacting the disc. The elastic member 22 may be affixed to the inner surface of the casing 102 using any suitable adhesive means 42 such as an adhesive tape. The projection 26 may be formed by bending when the elastic member is made of a metal material. Alternatively, it may be formed by drawing when it is made plastic or synthetic resin material such as PET.

As can be seen from the foregoing, in the disc cartridge of the present invention, the elastic member mounted on the inner surface of the casing contacts and thereby forces the sheet-like liner arranged between the elastic member and the disc against the disc by means of the elastic members projection portion formed, resulting in the liner being pressedly contacted with the disc at pressing force for a long period of time. This ensures stable and positive operation of the disc cartridge while permitting the liner to achieve a disc cleaning effect the contact between the head of a cartridge operating unit and the disc.

Also, this construction of the present invention illustrated in the aforementioned preferred embodiments effectively eliminates any contact between the distal end of the elastic member and the disc, such that damage of the disc may be effectively prevented even if a burr is formed at the distal end of the elastic member, because the distal end is prevented from contacting the surface of the disc. This results in the useable lifetime of the disc cartridge being significantly extended and the reliability of the disc cartridge being significantly improved.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a manner of language, might be said to fall therebetween.

What is claimed is:

1. A disc cartridge comprising:
    a casing having a space defined therein;
    a disc rotatably received in said space of said casing;
    at least one sheet-like liner arranged in said casing in a manner to be contactable with a surface of said disc; and
    at least one elastic member arranged in said casing for forcibly contacting said liner with said disc;
    said elastic member having one end affixed an inner surface of said casing and the other end acting as a free end;
    said elastic member being formed with a projecting portion by means of which said elastic member forcibly contacts said liner with said disc and wherein said projecting portion contacts said liner at a single position between said one end and said free end and wherein said elastic member is so formed that the distance between said free end and said projecting portion is substantially smaller than the distance between the part of said projecting portion in contact with said liner and said one end.

2. A disc cartridge as defined in claim 1, wherein said elastic member is formed of a metal material into a somewhat arcuate shape.

3. A disc cartridge as defined in claim 1, wherein said elastic member is formed of a synthetic resin material into a somewhat arcuate shape.

4. A disc cartridge as defined in claim 1, wherein said projecting portion is formed into a predetermined length.

5. A disc cartridge as defined in claim 4, wherein said elastic member is so arranged that said projecting portion extends in a radial direction of said disc.

6. A disc cartridge as defined in claim 5, wherein said projecting portion is substantially ridge-shaped at said location.

7. A disc cartridge as defined in claim 5, wherein said projecting portion is substantially planar at said location.

8. A disc cartridge as defined in claim 5, wherein said projecting portion has a length larger than a distance between the innermost periphery of the recording section of said disc and its outermost periphery.

9. A disc cartridge as defined in claim 1, comprising two said sheet-like liners arranged on each side of said disc and two elastic members is mounted on each of upper and lower inner surfaces of said casing with each of said liners being interposed between said disc and said elastic members.

* * * * *